United States Patent Office 3,437,733
Patented Apr. 8, 1969

3,437,733
METHOD FOR PRODUCING ELECTRODE PASTE
Niles Johan Haavik, Nordstrand, Oslo, and Gunnar Nyberg, Vagsbygd, near Kristiansand, Norway, assignors to Elektrokemisk A/S, Oslo, Norway, a corporation of Norway
Original application Mar. 4, 1966, Ser. No. 531,700, now Patent No. 3,388,205, dated June 11, 1968. Divided and this application Oct. 16, 1967, Ser. No. 687,407
Int. Cl. H05b 7/10
U.S. Cl. 13—9      7 Claims

ABSTRACT OF THE DISCLOSURE

An electrode paste comprising a mixture of carbonaceous material and a binder therefor is made by electrically preheating the carbonaceous material, before it is mixed with the binder, in a zone the cross-sectional area of which transverse to the path of current flow therein increases from a predetermined point in the zone to the point at which the current is fed to the carbonaceous material, whereby temperature differences between various portions of the zone are kept below about 100° C. After the carbonaceous material is so preheated, it is then mixed with the binder to form the electrode paste.

---

This application is a division of our copending application Ser. No. 531,700, filed Mar. 4, 1966.

This invention relates to production of electrode paste for electrodes in electric smelting furnaces and furnaces for melt-electrolytic production of aluminium. As is known, such paste consists of a carbonaceous raw material, as for instance anthracite, meltallurgical coke or petrol coke, which is calcined and mixed with a binder as for instance tar and/or pitch. The calcined carbonaceous raw material, the so-called dry material, which has been crushed and screened to define grain size, is mixed with liquid pitch and/or tar, whereupon the paste is baked in a separate furnace or in the same furnace in which the electrode is to be used.

The mixing of the electrode paste is usually carried out in a mixer which is equipped with heating elements so that the mixing may take place at temperatures of 150–200° C. The pitch and/or tar is supplied to the mixer in solid and cold state or in liquid state at temperatures of up to 200° C. while the dry material is supplied in cold state. The materials supplied in cold state will go through the whole heating process in the mixer itself. The dry material is usually heated separately in the mixer before the binder is supplied. The heating of the batch in the mixer requires comparatively much time, and it is evident that such procedure represents a very uneconomical utilization of the mixing equipment, as a considerable part of the operating period is spent in pure heating. Such mixers are also comparatively expensive in purchase and maintenance.

There has now been found a method for better utilization of the mixer. According to this method the carbonaceous raw material for the electrode paste is preheated in a separate preheater in which the heating is effected by means of electric current which passes through the carbonaceous charge. The electric current is supplied to the material to be heated by means of electrodes which are built into the walls of the preheater and constitute a part of these walls. The preheated dry material while hot is then transferred to the mixer, in which it is mixed with cold solid or hot liquid pitch or tar which is supplied separately.

In carrying out the process of the present invention it was found that preheating of the carbonaceous dry raw material could not be carried out with the desired uniformity in an electric furnace of conventional configuration. With a furnace of the usual design the preheating is so uneven that differences in temperature of up to about 600° C. were found in the preheated material in the furnace. The carbonaceous material adjacent the electrodes was heated to very high temperatures while the material in the more remote area was at considerable lower temperatures.

This drawback in the uneven heating of the dry carbonaceous charge has now been overcome in accordance with the present invention by designing the preheater with a horizontal cross section which decreases in width as the distance from the electrode in the wall toward the center of the furnace is increased. As a result of this construction the desirable uniformity in the preheating of the dry carbonaceous material was achieved and the difference in the temperature of the material was reduced from about 600° C. to about 100° C. As we now understand it the reduction in the width of the cross section area of the furnace with increasing distance from the electrode toward the center of the furnace resulted in a much more even distribution of current density in the charge to give uniform preheating. As distinguished from this the current density in the charge of furnaces with conventional cross section area tends to be much greater adjacent the electrode as compared to the more remote areas toward the center of the furnace. Stated in another way a furnace made in accordance with the present invention has such a cross section that transverse sections through the current paths between the electrodes decrease in width with increasing distance from the electrodes toward the center of the furnace.

Satisfactory results have been achieved with a furnace in which the horizontal cross section is an approximate star or clover leaf with the electrodes built into the end wall of each arm or leaf. The electrical resistance will thus be very uniform within each arm, and a very even current distribution and consequently an even heat development will be obtained so that the temperature variations in the charge are decreased. The preheating is preferably carried out at an average temperature of about 150–250° C. When moist carbonaceous raw material is used, the preheater will also act as a dryer.

Further details of preferred constructions for the electric furnace of the present invention may best be understood by reference to the drawings in which.

Turning now to the drawings, 10 indicates an electric preheating furnace made in accordance with the present invention with horizotnal cross section area generally in the form of a star or clover leaf so that the cross section area of the charge between the electrodes decreases in width as the distance from the electrode toward the center of the furnace is increased. As a result vertical transverse sections through the current paths between the electrodes are substantially constant in area with increasing distance from the electrode to provide a more even current density throughout the charge in the furnace for uniform preheating of the charge. As shown the furnace is provided with electrodes 12 which are built into the wall of the furnace with graphite blocks or other conductive material to form at least a part of the furnace wall. The remainder of the furnace wall is made of the usual refractory material 14 which is an electric insulator and an outer metal or other casing 16 may be employed.

Figure 1:
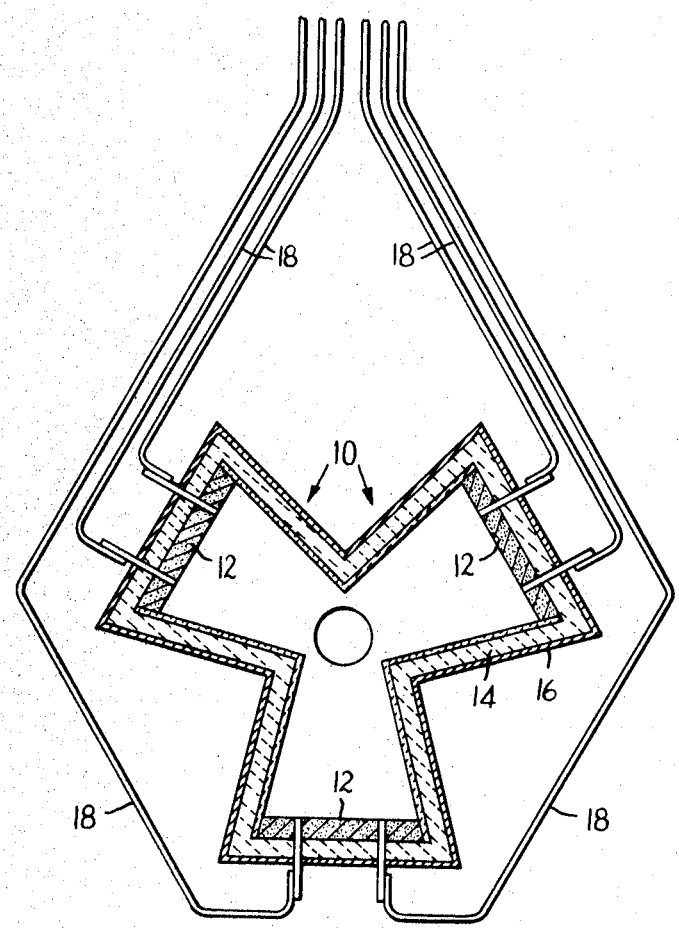
FIG. 1 is a schematic illustration of a horizontal cross section of a three-phase electric preheating furnace.
Figure 2:
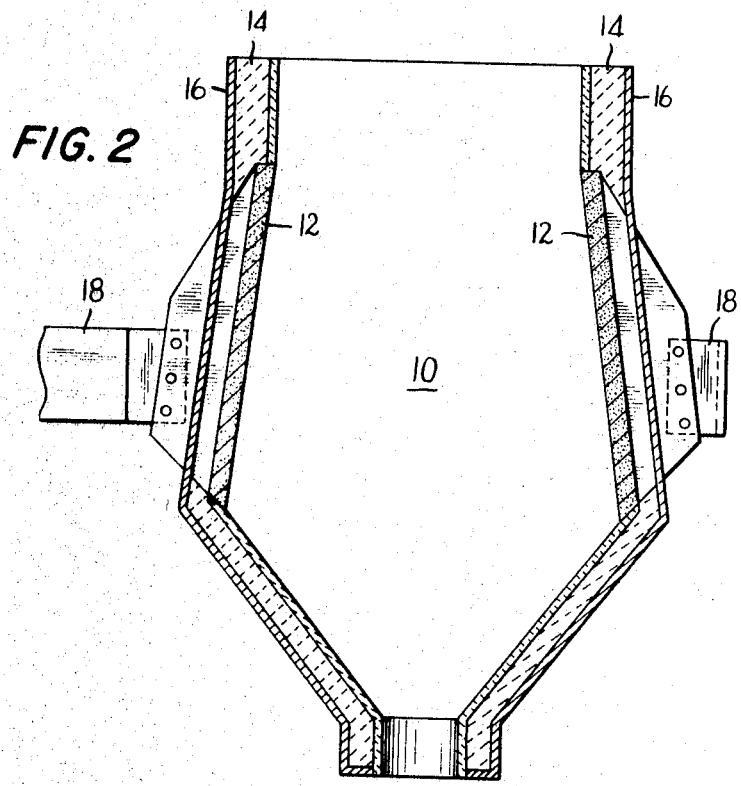
FIG. 2 is a longitudinal section through the furnace of FIG. 1.

One or more bus bars 18 supply the electric current from the transformers to the electrodes. In the furnace of FIG. 1 a three-phase current supply is shown. Referring to FIG. 2 it will be seen that the walls which comprise the electrodes slope slightly outwardly and while this is preferred, it is not essential and the walls may be made generally parallel.

Figure 3:
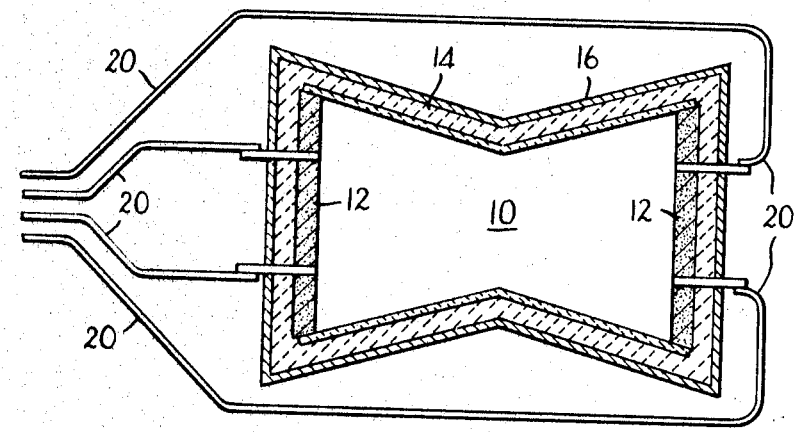
FIG. 3 illustrates a horizontal cross section of a preferred configuration for a two phase electric preheating furnace.

The furnace shown in FIG. 3 is identical to the furnace shown in FIGS. 1 and 2 except that only two electrodes 12 are employed in the furnace and single phase electric current is supplied to the electrodes by the bus bars 20. As in the case of the furnace of FIG. 1 the horizontal cross section area through the furnace decreases in width as the distance from the electrode toward the center of the furnace is increased to provide a more uniform current density through the dry carbonaceous charge. For most desirable results the furnaces are operated continuously. They may, however, also be operated batchwise.

In an example of batch operation of the furnace of FIG. 1, 1400 kilograms of cold calcined petroleum coke containing less than 2% volatile matter is charged to the furnace. The size of the particles in the charge is such that all of it passes through a 3-mesh Tyler sieve and 40% of the particles pass through a 200-mesh Tyler sieve. After consumption of about 40–50 kwh. in about 6 minutes the temperature of the material discharging from the furnace is about 130° C. The hot preheated coke is then fed into a conventional mixer (not shown) in which it is mixed in conventional manner with about 20% of liquid pitch based on the weight of the preheated carbonaceous material to form the electrode paste. The liquid pitch was supplied to the mixture at a temperature of about 175° C.

It will be understood that the present invention is not to be limited to the cross sections illustrated in the drawings for as will be obvious to those skilled in the art any desired cross section configuration may be employed which will provide the desired uniformity of current density in the charge.

It will also be understood that it is intended to cover all changes and modifications of the preferred embodiments of the invention herein chosen for the purposes of illustration which do not depart from the spirit and scope of the invention.

What is claimed is:

1. The method of producing electrode paste of the type which includes solid carbonaceous material and a binder therefor which comprises: placing the carbonaceous material in a separate treatment zone supplying an electric current to said carbonaceous material at a predetermined location thereon and passing said current through said carbonaceous material from said predetermined location, increasing the cross-sectional area of said carbonaceous material in said treatment zone transverse to the direction of current flow therethrough from a predetermined point within said treatment zone toward said predetermined location of current supply, thereby maintaining the difference in temperature between different portions of said carbonaceous material below about 100° C., and then mixing the hot carbonaceous material with the binder to form the electrode paste.

2. The method of producing an electrode paste as in claim 1 wherein said electric current is a two phase current.

3. The method of producing an electrode paste as in claim 1 wherein said electric current is a three phase current.

4. The method of producing an electrode paste according to claim 2 further comprising the step of increasing said transverse cross-sectional area of said carbonaceous material in said treatment zone in two predetermined directions from a common predetermined point within said treatment zone toward two predetermined locations of current supply.

5. The method of producing an electrode paste according to claim 3 further comprising the step of increasing said transverse cross-sectional area of said carbonaceous material in said treatment zone in three predetermined directions from a common predetermined point within said treatment toward three predetermined locations of current supply.

6. A method for producing electrode paste according to claim 1 wherein said predetermined point is the geometrical center of said treatment zone.

7. A method for producing electrode paste according to claim 1 wherein said cross-sectional area is increased by increasing the transverse width of said cross-sectional area.

References Cited

UNITED STATES PATENTS 1,670,052  5/1928  Soderberg _____ 13—18
3,092,437  6/1963  Carter et al. _____ 13—18 X BERNARD A. GILHEANY, *Primary Examiner.*

H. B. GILSON, *Assistant Examiner.*

U.S. Cl. X.R.

13—1, 7, 34